United States Patent
Clark et al.

(10) Patent No.: US 6,846,869 B2
(45) Date of Patent: Jan. 25, 2005

(54) METHOD FOR MAKING ARTICLES BY COLD COMPACTION MOLDING AND THE MOLDED ARTICLES PREPARED THEREBY

(75) Inventors: Kirby Clark, Kingwood, TX (US); Jens Ehlers, Hamminkeln (DE); Louis Wang, Raritan, NJ (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 10/672,054

(22) Filed: Sep. 26, 2003

(65) Prior Publication Data

US 2004/0155381 A1 Aug. 12, 2004

Related U.S. Application Data

(60) Provisional application No. 60/445,959, filed on Feb. 7, 2003.

(51) Int. Cl.$^7$ .............................. C08K 3/00; C08K 3/26; C08K 11/00; B29B 11/14
(52) U.S. Cl. ....................... 524/427; 524/424; 524/432; 524/433; 524/436; 524/442; 524/444; 264/122; 264/125; 264/126
(58) Field of Search ................................ 524/424, 427, 524/432, 433, 436, 442, 444; 264/109–128

(56) References Cited

U.S. PATENT DOCUMENTS

| | | | |
|---|---|---|---|
| 3,847,888 A | | 11/1974 | Baumgaertner |
| 4,902,451 A | * | 2/1990 | Inoue ......................... 264/437 |
| 5,587,440 A | | 12/1996 | Ehlers et al. |
| 6,313,208 B1 | | 11/2001 | Nose et al. |

FOREIGN PATENT DOCUMENTS

| | | |
|---|---|---|
| WO | WO-92/18549 | 10/1992 |

OTHER PUBLICATIONS

Yannig Thomas et al., "Effect of Processing Parameters During Warm Compaction and Free Sintering of UHMWPE Powders", ANTEC Annual Technical Conference, Society of Plastics Engineers, Apr. 1997, Toronto, Canada.

G. W. Halldin and M. R. Shah, "Compaction of Polymer Powders"; ANTEC Annual Technical Conference, Boston, May 1981, pp. 353–355.

G. W. Halldin and I. L. Kamel, "Powder Processing of Ultra–High Molecular Weight Polyethylene. I. Powder Characterization and Compaction"; Polymer Engineering and Science, Jan., 1977, vol. 17, No. 1. p. 21–26.

Kyowa Chemical Industry Co., Ltd. "DHT–4A"; Osaka, Japan.

* cited by examiner

Primary Examiner—Stephen J. Lechert, Jr.
(74) Attorney, Agent, or Firm—Michael W. Ferrell

(57) ABSTRACT

A method for making an article by cold compaction molding. The method comprises compacting a resin composition comprising high molecular weight and ultra high molecular weight polyethylene (HMW-PE and UHMW-PE, respectively) homopolymer, copolymer, and/or blend and an inorganic acid scavenger at a temperature below the softening temperature of the composition. An article prepared in accordance with the claimed method shows lower corrosion test data compared to articles prepared from virgin HMW-PE and UHMW-PE, and an improved cold compaction strength compared to articles prepared using resins containing metal soaps.

12 Claims, 1 Drawing Sheet

METHOD FOR MAKING ARTICLES BY COLD COMPACTION MOLDING AND THE MOLDED ARTICLES PREPARED THEREBY

CROSS-REFERENCE TO RELATED APPLICATION

This application claims priority to U.S. provisional patent application Ser. No. 60/445,959, filed Feb. 7, 2003, the disclosure of which is incorporated herein in its entirety.

FIELD OF THE INVENTION

The claimed invention relates to the field of high and ultra high molecular weight polyethylenes (HMW-PE and UHMW-PE, respectively) and methods of preparing articles comprising HMW-PE and UHMW-PE by cold compaction molding. More particularly, the method of the claimed invention comprises compacting a resin composition comprising HMW-PE or UHMW-PE and an inorganic acid scavenger. The invention is also directed to the thus prepared molded articles.

BACKGROUND OF THE INVENTION

HMW-PE and UHMW-PE powders are typically produced in slurry by using a Ziegler-type process. General features of HMW-PE and UHMW-PE production processes are disclosed in several patent publications. For example, U.S. Pat. No. 6,486,270 discusses preparation of a high molecular weight polyethylene. Manufacturing processes for the production of UHMW-PE are disclosed by U.S. Pat. No. 5,587,440 and EP 645,403. Catalysts with high activity for these processes have been recently developed. One example of such a catalyst system is the reaction product of titanium tetrachloride and trialkylaluminum.

A certain amount of residual catalyst byproducts, e.g., chloride ion, invariably leaches from the catalyst and remain in the HMW-PE and/or UHMW-PE after polymerization. In the presence of water, these residual catalyst byproducts can create chlorine and hydrochloric acid, which can potentially damage or corrode the equipment used during the polymer processing.

In order to reduce the potential for corrosion, chlorine/acid acceptors or scavengers are generally added in low levels, typically about 0.01–5.00% by weight, to the dry polymer during polymerization or after formation. The acid scavengers most widely used by HMW-PE and UHMW-PE manufacturers are metal soaps. The most common metal soaps used as acid scavengers are stearates, e.g., calcium stearate and zinc stearate. In addition to serving as acid scavengers, stearates also function as internal lubricants and as mold release agents.

Articles formed from HMW-PE and UHMW-PE polymers can be prepared in a one-step process by using high temperature compression, or in a two-step process comprising cold compaction molding followed by high temperature compression molding. During high-temperature compression molding, HMW-PE or UHMW-PE powder is poured into a positive pressure mold that is heated and then cooled under pressure. The cooled mold is then opened to yield a fully sintered HMW-PE or UHMW-PE article. An example of high temperature molding of synthetic resins is provided by U.S. Pat. No. 6,313,208. In accordance with this publication, particles of a highly purified form of hydrotalcite are mixed with a thermoplastic resin for use as a heat stabilizer, or as an acid-acceptor, in a thermal molding process. Although U.S. Pat. No. 6,313,208 discloses HMW-PE and UHMW-PE as examples of thermoplastic resins that may be used in thermal molding, none of the working examples of U.S. Pat. No. 6,313,208 are directed to applications using HMW-PE or UHMW-PE.

In contrast to thermal molding as described by U.S. Pat. No. 6,313,208, HMW-PE or UHMW-PE powder is compressed during cold compaction molding without the application of heat to form a preliminary article, sometimes called a preform. Optionally, the preform is subsequently combined or molded with a second material, e.g., rubber or another plastic, and sintered at an elevated temperature and pressure to obtain the final article.

Previously, it was assumed that the low levels of stearates and other organic-based additives added to HMW-PE or UHMW-PE as acid scavengers during processing had no effect on the cold compaction strength of molded articles comprising the HMW-PE or UHMW-PE resin. Cold compaction strength, also termed "green strength", is an expression known and used in the art to mean the mechanical strength that a compacted powder must have in order to withstand mechanical operations to which it is subjected after pressing and before sintering, without damage to its fine details (McGraw-Hill Dictionary of Scientific and Technical Terms, Second Edition, 1978).

However, Applicants have unexpectedly found that the internal lubricating properties of stearates significantly weaken the bonding properties of HMW-PE and UHMW-PE granules during cold compaction. HMW-PE and UHMW-PE resins containing metal soaps have been found to have a significantly lower compaction strength than pure resins. By pure resin, it is meant to include virgin resin, i.e., additive-free resin that may have residual catalyst byproducts. The metal soap additives lubricate the HMW-PE or UHMW-PE particles during compaction and, consequently, the preform obtained is especially susceptible to crumbling. Furthermore, a small variation in the metal soap concentration in the resin leads to a great variation in the cold compaction strength values of the articles and, therefore, it is especially important to carefully monitor addition of metal soaps to the resin in order to avoid over- or under-addition.

Therefore, it would be desirable to have methods for the preparation of articles formed from cold compacted HMW-PE or UHMW-PE, which do not contain metal soaps, and which do not show significant degradation of cold compaction strength.

SUMMARY OF THE INVENTION

The claimed invention provides a process for making a HMW-PE or UHMW-PE article by cold compaction molding without significant degradation of the cold compaction strength of the molded article.

In one aspect of the claimed invention, a powdered resin composition comprising a HMW-PE or an UHMW-PE and an inorganic acid scavenger is compacted at a temperature below the melting temperature of the HMW-PE or UHMW-PE resin to form a molded article.

The resin composition is subjected to pressures in the range of 50 psi to 6,000 psi (3 bar to 413 bar) during compaction. The compaction temperature is in the range of about 0–120° C. Optionally, the method further comprises sintering the molded article at an elevated temperature after compaction.

Examples of acid scavengers as contemplated by the invention include, but are not limited to, metal oxides, metal carbonates, silicates and mixtures thereof. The concentration of the acid scavenger in the resin composition is in the range of about 10–5000 ppm.

Advantageously, molded articles prepared in accordance with the method of the present invention are characterized by an improved cold compaction strength. Typically, the cold compaction strength of molded articles prepared in accordance with the claimed method is not less than 75% of the cold compaction strength of an article prepared from virgin HMW-PE or UHMW-PE, i.e., an additive-free polymer. In certain embodiments of the invention, the cold compaction strength is not less than 90% of an article prepared from virgin HMW-PE or UHMW-PE. Also, the cold compaction strength of articles prepared in accordance with the claimed method is significantly better, on the order of a 50–200% improvement, than the compaction strength of articles prepared from metal soap-containing resin.

DETAILED DESCRIPTION

Figure 1:
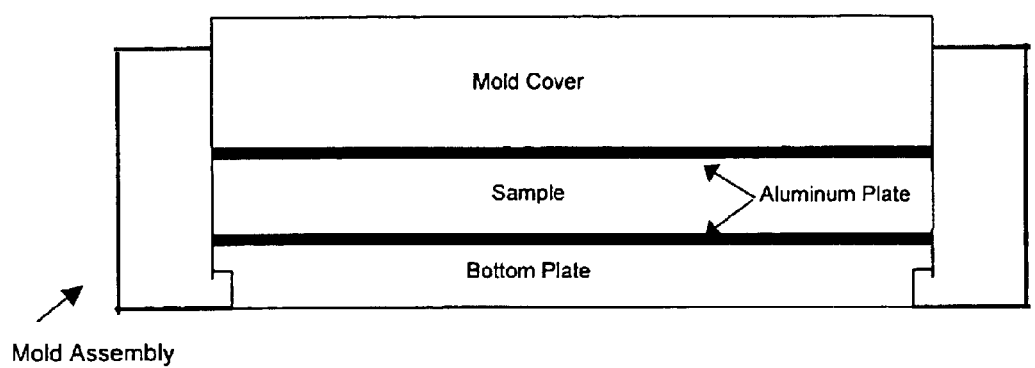
FIG. 1 illustrates a mold assembly arrangement which may be used in performing the method of the invention.

Any type of HMW-PE or UHMW-PE can be used in the resin composition. The HMW-PE or UHMW-PE can be linear or branched, or have any particular characteristics which provide suitable properties to the desired molded article. HMW-PE has an average molecular weight, measured by viscometry, of 300,000 g/mol to 1,000,000 g/mol. UHMW-PE has an average molecular weight, measured by viscometry, of at least 1,000,000 g/mol, and in particular 2,500,000 g/mol to about more than 10,000,000 g/mol. An example of a commercially available HMW-PE is Ticona grade GHR 8110 and examples of UHMW-PE are Ticona GUR grades 4120, 4130, 4150, 4170, and 2122 (all available globally from Ticona LLC, Summit, N.J.).

A method for the determination of the molecular weights of polyethylene is described, for example, in CZ-Chemische Technik 4 (1974), 129 et seq. ASTM D4020 provides additional information regarding the relationship between UHMW-PE molecular weight, intrinsic viscosity, and approximate viscosity average molecular weight.

Typically, the molecular weight of the HMW-PE in the present invention will be in the range of 300,000 to 500,000, and the molecular weight range of the UHMW-PE will be in the range of 1,000,000 to 5,000,000. In one embodiment, HMW-PE and UHMW-PE having a bulk density in the range of about 0.15–0.60 gm/cm$^3$ have been found to be particularly suitable.

In an embodiment of the invention, the HMW-PE or UHMW-PE is a homopolymer of ethylene, which can be linear or branched. In another embodiment of the invention, the HMW-PE or UHMW-PE is a copolymer of ethylene and another olefin, such as propylene, butylenes, hexenes, or higher 1-olefins. The polymer can also be a blend of polyethylene and one or more additional polymers such as polypropylene or polybutylene. However, the amount of the non-ethylene monomer in the copolymer, or the amount of the non-polyethylene polymer in the blend, will be lower than 10% so that the physical characteristics of the predominant HMW-PE or UHMW-PE is not detrimentally impacted by the other monomer or polymer.

The acid scavenger in the resin composition is an inorganic acid scavenger. It has been surprisingly found that acid scavengers selected from the group consisting of metal oxides, metal carbonates, silicates and mixtures thereof provide particularly favorable acid scavenging properties. Examples of suitable metal oxides are zinc oxide and magnesium oxide. Examples of metal carbonates are sodium carbonate and calcium carbonate. The metal carbonate can also be a hydroxy metal carbonates, such as dihydroxy aluminum-sodium carbonate or hydrotalcite. A suitable silicate is aluminum silicate.

Advantageously, only small quantities of acid scavenger in the resin composition are needed. The amount of acid scavenger is generally in the range of about 10–5000 ppm by weight, and more typically in the range of about 100–300 ppm. The concentration of the acid scavenger in the resin may vary, provided that there is a sufficient quantity of the acid scavenger to remove free acid and/or chloride from the HMW-PE or UHMW-PE for cold compaction and any subsequent processing. The concentration will vary depending upon the particular application and scavenger selected.

In addition to the HMW-PE or UHMW-PE and the inorganic acid scavenger, the resin composition may optionally contain other additives including, but not limited to, fillers, plasticizers, pigments, UV-stabilizers, antioxidants, antistatic agents, and other commonly used additives which would not affect the properties of the molded article for its intended application.

In general, the resin composition is in the form of a powder prior to compaction. However, in certain applications, it may be desirable for the resin composition to be in the form of fine granules. The scavenger and any optional additives can be blended into the HMW-PE or UHMW-PE using known techniques. For example, the polymer and acid scavenger can be mixed using a ribbon blender, high-speed mixer, pelletizer, extruder, or other technique known to those of skill in the art.

The resin composition needs no heating during compaction which generally occurs at ambient temperatures, e.g., in the range of about 60° F. to about 80° F. However, if ambient temperatures are low, compaction can be conducted at temperatures higher than ambient provided that the compaction temperature is below the melting temperature of the HMW-PE or UHMW-PE. The melting temperature will necessarily depend upon the characteristics of the polymer, such as molecular weight and degree of branching. The melting temperature of the HMW-PE will typically be in the range of 100° C. to 145° C. (R. P. Quirk, M. A. A. Alsamarraie, Institute of Polymer Science of Akron; Akron, Ohio). The melting temperature for UHMW-PE, which does not have a melting point per se, is to be considered as the crystalline melting temperature of the polymer, which is known to those of skill in the art as the peak temperature in a differential scanning calorimetry (DSC) scan. The crystalline melting temperature of UHMW-PE, whether homopolymers, copolymers, or blends, will typically be in the range of 100–145° C.

The pressures that the resin composition is subjected to will vary depending upon the properties of the composition and the subsequent use of the article. In practice, the pressures during compaction will typically range between 50 psi and 5,000 psi.

Compaction may occur as a single step at a given set of conditions, or it may comprise a plurality of separate compaction steps, each occurring at different conditions, such as a series of varying pressures and corresponding hold times. The article may be optionally sintered at an elevated temperature after compaction. In general, equipment and methods for cold compaction of polyethylene are known to those of skill in the art.

Advantageously, the inorganic acid scavengers used in the claimed process are more efficient than stearates. In certain embodiments, molded articles prepared from the UHMW- PE resin composition comprising the acid scavengers showed reduced corrosion of an iron test specimen, which was molded within the PE-mass and treated with steam afterwards, by more than 40% compared to stearated resins. Furthermore, molded articles prepared in accordance with the method of the claimed invention are characterized by an improved cold compaction or green strength.

The compaction strength of the preform article can be obtained using techniques known to those of skill in the art. For example, DIN ISO 527/1 and DIN EN 20527/2 disclose methods of obtaining the cold compaction strength of an article via a bending test. DIN ISO 178 provides additional testing cold compaction strength testing methods.

EXAMPLE 1

The following example illustrates a method of the claimed invention. Advantageously, the molded articles prepared thereby are characterized by an improved cold compaction strength compared to articles formed from HMW-PE or UHME-PE containing metal soaps, e.g., a metal stearate such as calcium stearate. Although the example illustrates cold compaction of UHMW-PE, comparable conditions would be used for HMW-PE.

Apparatus 60 ton Wickert Press Type WLP 600/3/3 with Regoplas chiller unit;

Positive pressure, matched die, carbon steel mold with 14 mm diameter cavity;

Aluminum plates (0.2 mm thick); and

Ulmia Type 1708 circular saw.

Process

The mold was assembled and an aluminum plate was placed in the bottom of the mold cavity. A resin composition (90 grams) comprising an UHMW-PE powder and one of the identified inorganic acid scavengers was poured into the mold cavity assembly. The powder was leveled until a smooth surface was obtained, and was then covered with a second aluminum plate and the mold cover. A mold release agent was not added. The mold and resin composition were both at ambient temperature.

The filled mold assembly was placed in the center of the Wickert press, and the assembly was subjected to a pressure of 136 bar (1972 psi) for 2 minutes. After 2 minutes, without releasing the pressure, the pressure was increased to 373 bar (5409 psi) and held for another 15 minutes. During compaction, the temperature was controlled to 20±2° C.

After 15 minutes, the platens were opened and the mold assembly removed from the press. The mold assembly was disassembled and the finished article was removed. The article was held at room temperature (23° C.) for 1 hour before its cold compaction strength was determined. Test samples (about 120 mm×12.5 mm×8.0 mm in size) were cut from the article using the circular saw.

FIG. 1 illustrates the mold assembly arrangement, as follows, from top to bottom;
 a. mold cover
 b. aluminum plate
 c. UHMW-PE powder
 d. aluminum plate
 e. bottom plate of mold.

Table 1 below demonstrates the improved cold compaction strength and reduced corrosiveness of articles prepared in accordance with Example 1. Virgin UHMW-PE was used as the baseline for the comparison. The virgin UHMW-PE polymer had an elongational stress (ES) of 0.43 MPa, a particle size ($d_{50}$) of 125 micron, and a bulk density of 0.38 g/cm$^3$. The cold compaction strength was measured with a UTS Type 10T Universal Testing Machine (UTS Testsysteme GmbH) using a modified version of the known DIN ISO 527/1 and DIN EN 20527/2 procedures.

The corrosivity of each sample was determined using the following test procedure. A steel strip (0.07% C, length 25 mm) was cleaned with acetone, and the cleaned steel strip was placed on 3 g polyolefin powder in a mold (diameter 5 cm). After adding 3 g additional polymer on top of the steel strip, the mold was closed, heated up to 250° C. within 10 min, and then pressed for 50 min at 5 bar. The mold was cooled down to 40° C. at 25 bar within 10 min, and the steel strip was cut out of the compressed polymer and treated with steam for 1 h. The weight increase was determined as the difference between the weight of the corroded end product and the weight of the original, cleaned steel strip.

TABLE 1

| | Concentration [ppm] | Corrosivity[1] [%] | Cold Compaction Strength [kPa] |
|---|---|---|---|
| Additive | | | |
| None (virgin resin) | — | 0.20 | 1650 |
| Metal soap | | | |
| Ca-stearate | 500 | 0.10 | 500 |
| | | 0.08 | 680 |
| | | 0.15 | 1020 |
| Zn-stearate | 500 | 0.09 | 860 |
| | | 0.07 | 1350 |
| Inorganic acid scavenger | | | |
| Hydrotalcite | 250 | 0.01 | 1650 |
| | | 0.01 | 1550 |
| | | 0.01 | 1300 |
| | | 0.02 | 1700 |
| Di-hydroxy-aluminum-sodium carbonate | 250 | 0.01 | 1690 |
| Alumosilicate | 250 | 0.10 | 1690 |
| Calcium carbonate | 250 | 0.03 | 1350 |
| Zinc oxide | 250 | 0.06 | 1450 |
| Magnesium oxide | 250 | 0.09 | 1280 |
| | | 0.09 | 1750 |

[1]Determined as the weight increase of an iron plate after molding in the polymer and treatment with moisture.

As can be seen in Table 1, articles prepared using virgin, additive-free UHMW-PE had a cold compaction strength of 1650 kPa. However, these articles caused a high amount of corrosion of an iron test sample, 0.20%, due to the presence of unneutralized residual catalyst in the UHMW-PE polymer. Addition of metal soaps and non-lubricating inorganic acid scavengers to the resin reduced corrosion levels compared to virgin polymer. However, the inorganic acid scavengers showed a much better reduction in corrosion than the metal soaps. In addition, the cold compaction strength of the inorganic acid scavenger-containing resin was significantly higher than the cold compaction strength of the metal-soap containing resin.

Although resin compositions containing aluminosilicate and stearates showed comparable decreases in corrosiveness, the cold compaction strength of the molded article made from the stearate-containing resin was significantly inferior compared to molded articles prepared from the aluminosilicate-containing resin in accordance with the invention. The cold compaction strength of molded articles formed from resin compositions containing dihydroxy aluminum sodium carbonate and hydrotalcite were comparable to or better than those obtained for the virgin material, and corrosiveness was reduced dramatically compared to the virgin resin.

As shown in Table 1, it is noteworthy that the loadings for the inorganic acid scavengers as used in the UHMW-PE resin compositions containing them were half of the loadings of the metal soaps. That is, the inorganic acid scavengers were present in the resin composition at a concentration of 250 ppm, whereas the concentration of the metal soaps was 500 ppm.

The data demonstrates that the invention provides molded articles which have little or no reduction in cold compaction strength compared to the virgin resin, at lower loadings of acid scavenger, with superior reduction in corrosion. The lower loadings permit a reduction in raw material costs. Furthermore, the articles prepared by the present invention are not discolored by the acid scavenger.

In accordance with another embodiment, the molded articles, or preforms, prepared in accordance with the claimed invention are subjected to an optional sintering step. Sintering processes and equipment are well known to the person of ordinary skill in the art. The inclusion of a sintering step is dependent upon the particular application or intended use of the molded article.

Advantageously, it is possible to combine, add or apply one or more layers, parts or components comprising a resin or rubber to the surface of molded articles prepared by the cold compaction process of the invention. Examples of such rubbers include, but are not limited to, styrene butadiene rubber (SBR), EPDM, chloroprene (CR), natural rubber (NR), isobutene isoprene (IIR), and chloroisobutene isoprene (CIIR). Cross-linking agents such as sulfur or peroxide can be used to internally crosslink the resin or rubber and to form a more secure bond between the polyethylene and the resin.

In this embodiment, after the preform article is formed by cold compaction, the thermosetting material is applied or contacted with the preform article, and heat and pressure are applied. Advantageously, a strong bond between the resin and the polyethylene is formed. After cooling, the sintered article is removed from the mold, and is suitable for its subsequent intended use. The bonds between UHMW-PE and SBR are much stronger than bonds between SBR and lower molecular weight HDPE's.

When metal soaps are used as acid scavengers during preparation of the preform articles, the thermosetting resin and perform article do not fuse successfully together to form the new article. In contrast, when the acid scavengers of the present invention are employed in place of metal soaps, there is no internal lubrication, and fusion of the two materials occurs successfully and a strong bond is formed between the two layers.

Without being bound by theory, it is envisioned that the high bond strength between HMW-PE or UHMWPE and resin is due to the formation of entrapped tangles between chains of the polyethylene and the resin. Upon the application of heat, the metal soaps migrate to the surface of the polyethylene and act as a grease and lubricant, and thereby preventing bonding.

Numerous modifications and variations of the present invention are possible in light of the above teachings, and therefore, within the scope of the appended claims, the invention may be practiced otherwise than as particularly described.

What is claimed is:

1. A method for making an article by cold compaction molding, wherein the method comprises cold compacting a resin composition comprising a HMW-PE or an UHMW-PE and an inorganic acid scavenger at a temperature below the melting temperature of the polyethylene to form the article.

2. The method according to claim 1, further comprising sintering the article at an elevated temperature after compaction.

3. The method according to claim 1, wherein the molecular weight of the polyethylene is above about 200,000.

4. The method according to claim 1, wherein the resin composition is subjected to pressures in the range of about 50 psi to about 6,000 psi during compaction.

5. The method according to claim 1, wherein the compaction temperature is about 0–120° C.

6. The method according to claim 1, wherein the acid scavenger is selected from the group consisting of metal oxides, metal carbonates, silicates and mixtures thereof.

7. The method according to claim 1, wherein the concentration of the acid scavenger in the resin composition is in the range of about 100–2500 ppm.

8. The method according to claim 1, wherein the resin composition is in the form of a powder before compaction.

9. A molded article prepared in accordance with the method of any one of claims 1–8.

10. The molded article according to claim 9, wherein the article is characterized by an improved cold compaction strength.

11. The molded article according to claim 10, wherein the cold compaction strength of the article is not less than about 75% of the cold compaction strength of an article prepared from virgin polyethylene.

12. The molded article according to claim 10, wherein the cold compaction strength of the article is not less than about 90% of the cold compaction strength of an article prepared from virgin polyethylene.

* * * * *